United States Patent [19]

Borgions

[11] Patent Number: 4,998,618
[45] Date of Patent: Mar. 12, 1991

[54] STORAGE CASE FOR OPTICAL DISCS

[75] Inventor: Willem J. Borgions, Louvain, Belgium

[73] Assignee: U.S. Philips Corporation, New York, N.Y.

[21] Appl. No.: 302,173

[22] Filed: Jan. 25, 1989

[30] Foreign Application Priority Data

Feb. 15, 1988 [NL] Netherlands ............................ 8800360

[51] Int. Cl.⁵ ........................ B65D 85/57; G11B 23/03
[52] U.S. Cl. .................................... 206/307; 206/444; 369/38; 369/36
[58] Field of Search ............... 206/309, 313, 307, 444; 369/36, 38, 39

[56] References Cited

U.S. PATENT DOCUMENTS

| 895,655 | 8/1908 | Mitchell | 206/309 |
|---|---|---|---|
| 4,084,694 | 4/1978 | Lainez et al. | 206/313 |
| 4,630,732 | 12/1986 | Snyman | 206/309 |
| 4,664,454 | 5/1987 | Schatteman et al. | 206/309 |
| 4,734,814 | 3/1988 | Fujino et al. | 206/444 |
| 4,788,673 | 11/1988 | Ikedo et al. | 206/444 |
| 4,800,554 | 1/1989 | Yamasaki et al. | 369/39 |

FOREIGN PATENT DOCUMENTS

| 0217393 | 2/1986 | European Pat. Off. . | |
|---|---|---|---|
| 181835 | 5/1986 | European Pat. Off. | 206/309 |
| 0240926 | 1/1987 | European Pat. Off. . | |
| 3440479 | 7/1986 | Fed. Rep. of Germany | 206/309 |
| 5322DE1 | 4/1987 | Fed. Rep. of Germany . | |
| 59-5466 | 12/1984 | Japan | 206/309 |
| 2160349A | 12/1985 | United Kingdom . | |

Primary Examiner—Paul T. Sewell
Assistant Examiner—Jacob K. Ackun, Jr.
Attorney, Agent, or Firm—John F. Moran

[57] ABSTRACT

Storage case for a plurality of record carrier discs, in particular CD-singles, includes a housing (1) with a plurality of superposed plate-shaped tray bodies (3). The tray bodies each have a supporting surface (5) for supporting one of the discs, and for moving the discs into or out of the housing, they are each individually pivotable about a pivoting spindle (11). The housing has side walls (19, 21) and rugged partitions (37, 47) which extend parallel to said supporting surfaces to guide and support the tray bodies. At least one of the side walls (19) has an inwardly offset wall portion (35) which serves to minimize the dimensions of the partitions (37) for given outer dimensions of the housing.

6 Claims, 3 Drawing Sheets i
STORAGE CASE FOR OPTICAL DISCS

BACKGROUND OF THE INVENTION

The invention relates to a storage case for a pluraltiy of record carrier discs, in particular optical discs, comprising a housing with superposed plate-shaped tray bodies. Each tray body has a supporting surface for supporting one of the discs and for moving the discs into or out of the housing is separately pivotable about a pivotal axis which is oriented transversely of the supporting. The housing has side walls and partitions which extend parallel to the supporting surfaces, each partition having a free edge and being adapted to guide and support the tray bodies when the bodies are situated at least partly inside the housing.

Such a storage case is known from European Patent Application No. 0,212,244 (herewith incorporated by reference). The known storage case has a rectangular housing comprising six tray bodies each having a supporting surface for an optical disc. The housing has two open side walls, two adjoining substantially imperforate straight side walls, as a top wall and a bottom wall. One of the side walls carries a pivoting device comprising a pivoting spindle about which the tray bodies can be pivoted parallel to their supporting surfaces to move optical discs into or out of the case. On their inner sides the two imperforate side walls are provided with comparatively narrow thin partitions disposed in five planes which extend parallel to the top wall and the bottom wall and which together with the top wall and the bottom wall form six compartments adapted to receive said six tray bodies. The case has been designed for the storage of optical discs having an outer diameter of 120 mm, referred to as Compact Discs (CDs or CDVs), and is adapted to cooperate with a suitable disc changer, or which an example is shown in said Euorpean Patent Application.

Until recently the above-mentioned Compact Disc was the only type of optical disc carrying audio information. However, recently it has been announced that a smaller version of the Compact Disc will be marketed, which verison has a smaller outer diameter than the normal CD. The new type of Compact Disc, also referred to as CD-single or mini CD, has an outer diameter of 80 mm. As a result of the introduction of the CD-single the problem arises that the smaller optical disc cannot be stored in the known storage case. An obvious solution to this problem would be to scale down the storage case in such a way that it is capable of storing the smaller optical discs. However, a drawback of this is that such a storage case is not compatible with the known commercially available disc changer. An alternative solution, i.e. to maintain the outer dimensions of the known storage case but to widen the partitions, the disadvantage that the partitions become so wide that they lose their rigidity and therefore do not constitute reliable guides for the tray bodies. Moreover, wide partitions are less attractive for production reasons. This is because the partitions are manufactured in an injection moulding apparatus, where it is important that the heat can be discharged rapidly after the partitions have been moulded. In the case of broad partitions, however, problems may arise with respect to the removal of heat, which may lead to long cycle times. Moreover, an irregular heat transfer may give rise to dimensional deviations.

SUMMARY OF THE INVENTION

At least one of the side walls has an inwardly offset wall portion to which a number of partitions are secured. Smaller optical discs can thus be stored in the storage case in an optimum manner while maintaining the same outer dimensions as the known storage case.

The invention enables a storage case having the same favourable characteristics as the known storage case to be designed in a surprisingly and extremely simple manner, the novel storage case being adapted to store optical discs having an outer diameter of 80 mm instead of an outer diameter of 120 mm and to cooperate readily with disc changers of the type disclosed in EP-A No. 0212244.

At a side facing the offset wall portion, the tray bodies may each be formed with a recess in which the offset wall portion engages when the relevant tray body is situated inside the housing. This embodiment has the advantage that at essential locations the outlines of the tray bodies correspond to the outlines of the tray bodies of the known storage case, so that no special measures have to be taken to adapt the storage case in accordance with the invention for use in conjunction with this conventional disc changer.

In a very stable and rugged preferred embodiment, of the side wall has an offset wall portion and a wall portion together constituting a chamber. An alternative embodiment is characterized in that the offset wall portion is a recessed portion of the side wall.

A further preferred embodiment is characterized in that the recess in the holder body is substantially U-shaped. For reasons of production and construction the wall portion which is engageable in the recess preferably has a shape corresponding to the U-shaped cross-section of the recess.

Yet another preferred embodiment, in which the optical discs stored in the housing can be stored effectively without play, is characterized in that the central part of the offset wall portion is provided with a resilient pad, for example made of foam rubber, to cooperate with the peripheral edges of discs to be placed on the supporting surfaces when the tray bodies are situated completely inside the housing, a plurality of partitions extending at opposite sides of the pad.

DETAILED DESCRIPTION OF THE PREFERRED EMBODIMENTS

Figure 1:
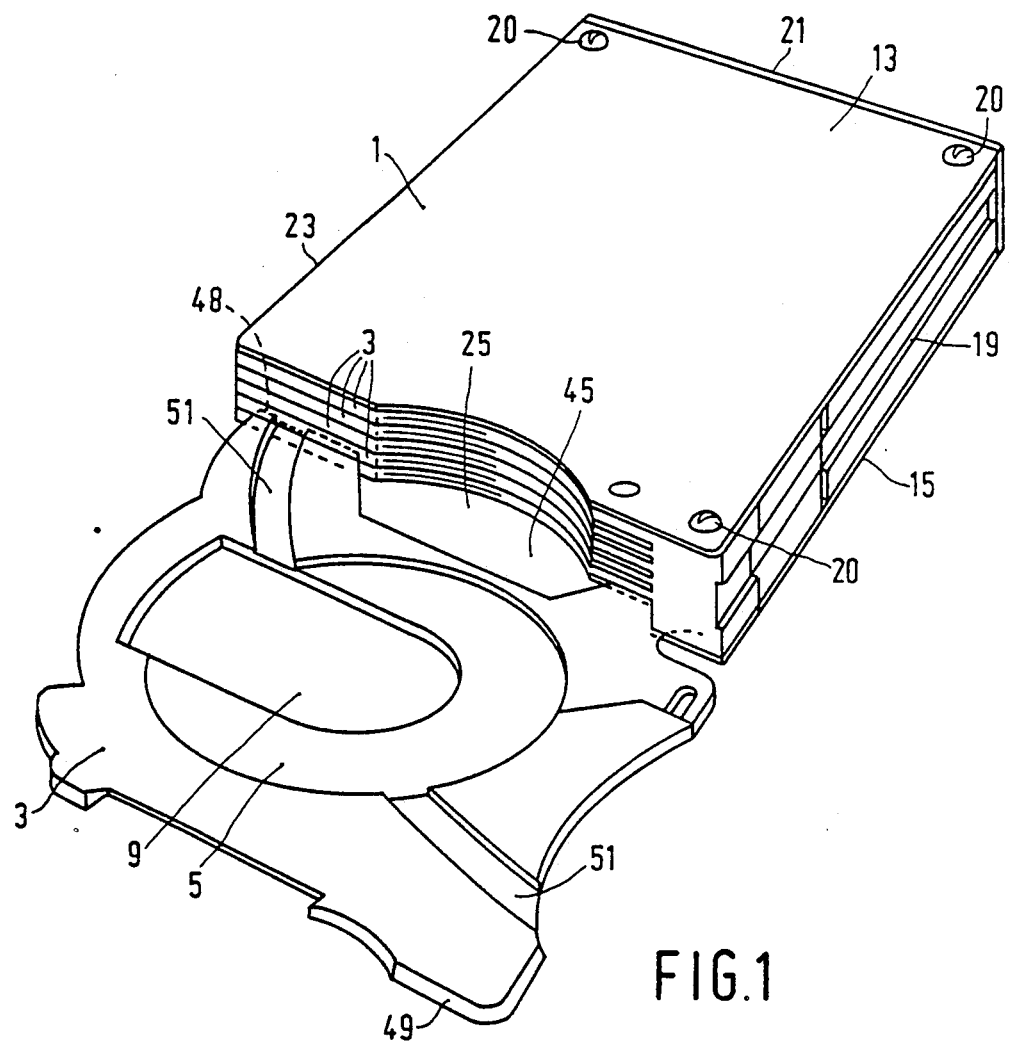
FIG. 1 is a perspective view of an embodiment of the storage case, showing one tray body in a swung-out position.
Figure 3:
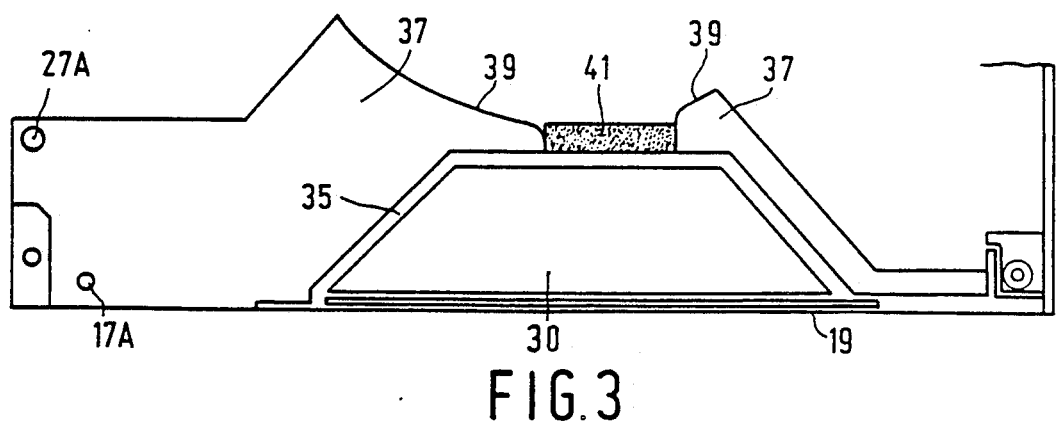
FIG. 3 is a plan view of a side wall of the storage case shown in FIG. 1.
Figure 2:
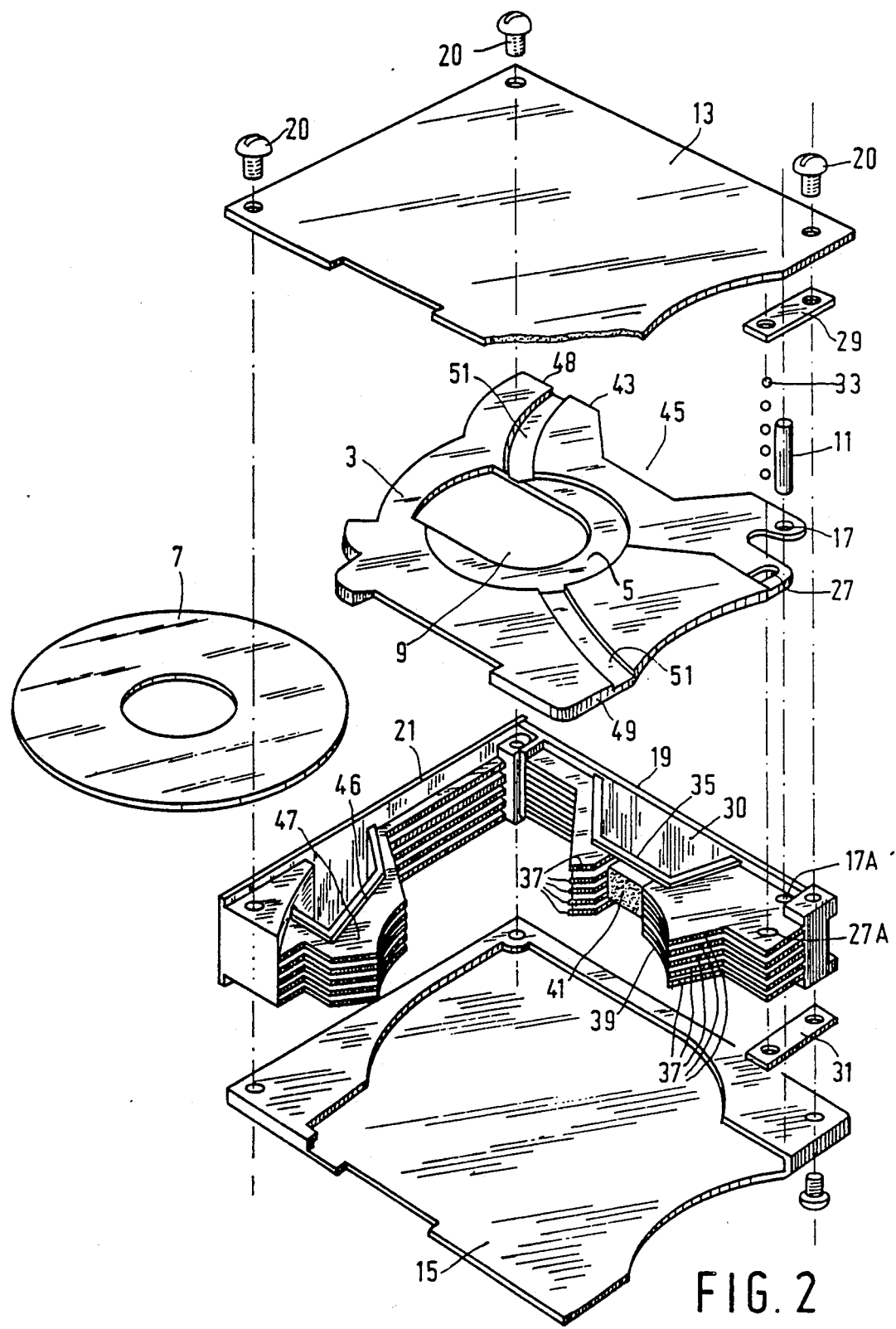
FIG. 2 is an exploded view of the storage case shown in FIG. 1.

The storage case in accordance with the invention shown in FIGS. 1, 2 and 3 has a housing 1 and six pivotable tray bodies 3. In principle the tray bodies 3 are identical; therefore only one of the tray bodies 3 is shown completely. The tray bodies 3 comprise a central recessed portion forming a supporting surface 5 adapted to receive a CD-single 7. The supporting surface 5 has a central aperture 9 to enable the CD-single to be optically scanned in a suitable optical disc-record player, such as the player disclosed in European Patent Application No. 0,212,244. The tray bodies 3 can be moved into and out of the housing 1 by a pivotal movement about a pivoting spindle 11. The pivoting spindle 11 is mounted between an upper section 13 and a lower section 15 of the housing 1 and extends through holes 17 in the tray bodies 3. In addition to the upper section 13 and this lower section 15, the box-shaped housing 1 comprises one fully and one largely imperforate side wall, 21 and 19 respectively, to which the sections 13 and 15 are connected with the aid of bolts 20, and to almost fully open sides 23 and 25. The side wall 19 has a hole 17A which is similar to the holes 17 and through which the spindle 11 extends. At a short distance from the hole 17A, the side wall 19 has a hole 27A similar to the holes 27 in the tray bodies 3. The holes 27 and 27A receive a plurality of balls 33 arranged between two resilient plates 29 and 31 for latching the tray bodies 3 in the housing 1. For a comprehensive description of such a latching mechanism and other details which are not actually relevant to an understanding of the present invention reference may be made to European Patent Specification No. 0,212,244.

The side wall 19 of the storage case in accordance with the invention comprises a substantially U-shaped wall portion 35, or an inwardly offset wall portion, and thin lamellar partitions 37 which are oriented transversely of the pivoting spindle 11 and which extend in five parallel planes. The partitions 37 are connected to the wall portion 35 and have free edges 39 at locations which are remote from the wall portion 35. Together the partitions 37 in combination with the upper section 13 and the lower section 15 constitute comparatively shallow spaces in which peripheral portions of the tray bodies 3, with or without a CD-single 7, are engageable. The partitions 37 are dimensioned in such a way that CD-singles on the inserted tray bodies 3 extend between the partitions 37 over a limited distance. The location and the dimensions of the wall portion 35 are such that supporting optical discs the tray bodies 3 are positioned against a foam rubber pad 41 glued to the wall portion 35. The side wall 19 together with the wall portion 35 and the partitions 37 may be constructed as an injection moulded product, a hollow chamber or compartment 30 being formed between the wall portion 35 and a part of the side wall 19. Such a moulded product is cheap and has very rugged partitions of minimal dimensions.

The tray bodies 3 of the storage case in accordance with the invention are each formed with a recess 45 at a side 43 which faces the side wall 19, viewed in the inserted portion. The recesses 45 have a shape corresponding to the cross-sectional shape of the wall portion 35 and are dimensioned in such a way that the wall portion 35 exactly engages the recesses 45 when the tray bodies are fully inserted in the housing 1.

Figure 3A:
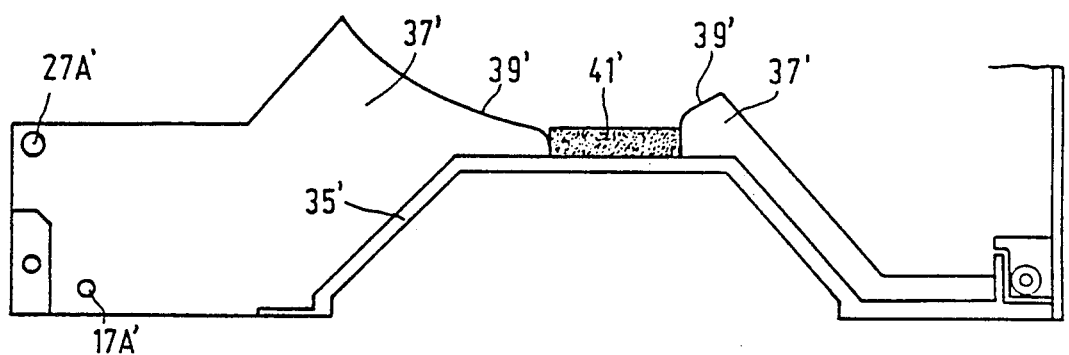
FIG. 3A provides an alternative shape for one of the sidewall portions of the storage case.

The side wall 21, which adjoins the side wall 19 and which is secured to said side wall 19 by means of screws, is provided with partitions 47 which extend in the same planes as the partitions 37 of the side wall 19. Similarly to the side wall 19, the side wall 21 has an offset wall portion 46 at its inner side to reduce the width of the partitions 47. In the fully inserted condition of the tray bodies 3 the tray bodies 3 and CD-singles supported thereby are situated in the spaces formed between the partitions 37 and the partitions 47, thereby guaranteeing a correct position of the tray bodies 3 and a rattle free storage of the CD-singles in the inserted condition. Moreover, the partitions 47 ensure a satisfactory guidance of the tray bodies 3 during the inward and outward movements of the tray bodies 3, due to a supporting surface 48 of the tray bodies 3. Alternatively, partition 37 may be shaped in accordance with FIG. 3A wherein partition 37' does not include wall portion 19, but otherwise includes all of the same parts designated with the same primed reference numerals, being supported on one of the partitions 47 even while in the swung-out positions of the tray bodies 3.

On their sides which do not cooperate with the side walls 19 or 21, the tray bodies 3 have at least locally thickened segments 49 which together close the open sides 23 and 25 at least partly in the inserted condition of the tray bodies 3. The tray bodies 3 are formed with grooved arcuate recesses 51, which extend from one side of the tray body 3 up to the supporting surface 5 for a CD-single. These arcuate recesses 51 serve for guiding soft pressure elements, not shown, which are provided on the underside of the tray bodies and which serve to prevent the CD-singles supported on the tray bodies from being damaged during the inward or outward pivotal movements of the tray bodies and to ensure that the CD-singles are held without play.

For the sake of completeness it is to be noted that further embodiments are possible within the scope of the invention. In particular, to provide a wall portion 35 or 46 may be arranged on only one of the side walls 19 and 21 respectively under specific circumstances. Moreover, the shape of such a wall portion is not restricted to the examples shown.

What is claimed is:

1. A storage case for a plurality of record carrier discs, in particular optical discs, comprising a housing with superposed plate-shaped tray bodies which each comprise a supporting surface for supporting one of the said discs and moving the discs into or out of the housing are each separately pivotable about a pivotal axis which is oriented transversely of the supporting surface, the housing comprises two main walls and side walls having partitions, the side walls are oriented transverse to the main walls, the plate-shaped tray bodies are parallel to the main walls and the pivotal axis is oriented transverse to the main walls, the partitions extending parallel to said supporting surfaces, which each comprise a free edge, and which are adapted to guide and support the tray bodies when said tray bodies are situated at least partly inside the housing, and at least one of the side walls comprising an inwardly offset wall portion sunken into the housing located at a central point along its side to which a number of partition are secured.

2. A storage case as claimed in claim 1, characterised in that the tray bodies are each formed with a recess which engages the inwardly offset wall portion when the relevant tray body is situated inside the housing.

3. A storage case as claimed in claim 1, characterized in that a chamber is formed between the offset wall portion and a portion of at least one of the walls.

4. A storage case as claimed in claim 1, characterized in that said wall portion is a recessed portion of one of the side walls external to the housing.

5. A storage case as claimed in claim 2, characterised in that said recessed portion is substantially U-shaped.

6. A storage case as claimed in claim 1 wherein an internal central part of the offset wall portion is provided with a resilient pad adapted to cooporate with the peripheral edges of the supporting surfaces for the discs when the tray bodies are situated completely inside the housing, a plurality of partitions extending at opposite sides of the pad.

* * * * *